United States Patent
Gafni et al.

(10) Patent No.: US 11,102,127 B2
(45) Date of Patent: Aug. 24, 2021

(54) LOAD BALANCING AMONG NETWORK LINKS USING AN EFFICIENT FORWARDING SCHEME

(71) Applicant: Mellanox Technologies TLV Ltd., Raanana (IL)

(72) Inventors: Barak Gafni, Campbell, CA (US); Gil Levy, Hod Hasharon (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/744,215

(22) Filed: Jan. 16, 2020

(65) Prior Publication Data

US 2020/0153739 A1 May 14, 2020

Related U.S. Application Data

(63) Continuation-in-part of application No. 15/959,234, filed on Apr. 22, 2018, now abandoned.

(51) Int. Cl.
| | |
|---|---|
| *H04L 12/803* | (2013.01) |
| *H04L 12/891* | (2013.01) |
| *H04L 12/825* | (2013.01) |
| *H04L 12/863* | (2013.01) |
| *H04L 12/935* | (2013.01) |
| *H04L 12/873* | (2013.01) |

(52) U.S. Cl.
CPC .......... *H04L 47/125* (2013.01); *H04L 47/263* (2013.01); *H04L 47/41* (2013.01); *H04L 47/623* (2013.01); *H04L 49/3027* (2013.01)

(58) Field of Classification Search
None
See application file for complete search history.

(56) References Cited

U.S. PATENT DOCUMENTS

| | | |
|---|---|---|
| 8,014,278 B1 | 9/2011 | Subramanian et al. |
| 8,514,700 B2 | 8/2013 | Hanes et al. |
| 9,331,929 B1 | 5/2016 | Thomas et al. |
| 9,923,816 B2 | 3/2018 | Kim et al. |
| | (Continued) | |

OTHER PUBLICATIONS

Thaler et al., "Multipath Issues in Unicast and Multicast Next-Hop Selection", Request for Comments: 2991, pp. 1-9, Nov. 2000.

(Continued)

*Primary Examiner* — Jay L Vogel
(74) *Attorney, Agent, or Firm* — Kligler & Associates Patent Attorneys Ltd (57) ABSTRACT

A network element includes multiple output ports and circuitry. The multiple output ports are configured to transmit packets over multiple respective network links of a communication network. The circuitry is configured to receive from the communication network, via one or more input ports of the network element, packets that are destined for transmission via the multiple output ports, to monitor multiple data-counts, each data-count corresponding to a respective output port, and is indicative of a respective data volume of the packets forwarded for transmission via the respective output port, to select for a given packet, based on the data-counts, an output port among the multiple output ports, and to forward the given packet for transmission via the selected output port.

17 Claims, 3 Drawing Sheets

(56) References Cited

U.S. PATENT DOCUMENTS

| | | |
|---|---|---|
| 10,075,377 B1 | 9/2018 | Sharma et al. |
| 10,091,112 B1 | 10/2018 | Sharma et al. |
| 2005/0169172 A1 | 8/2005 | Wang et al. |
| 2006/0165071 A1* | 7/2006 | Van Wageningen ............... H04L 49/3045 370/380 |
| 2010/0106866 A1* | 4/2010 | Aybay ............... H04L 47/52 710/29 |
| 2011/0161621 A1 | 6/2011 | Sinclair et al. |
| 2012/0275301 A1* | 11/2012 | Xiong ............... H04L 49/357 370/230 |
| 2014/0025923 A1 | 1/2014 | Klein |
| 2014/0119193 A1* | 5/2014 | Anand ............... H04L 45/28 370/237 |
| 2014/0133486 A1 | 5/2014 | Sivasankar et al. |
| 2014/0192646 A1* | 7/2014 | Mir ............... H04L 47/12 370/235 |
| 2014/0219090 A1* | 8/2014 | Ramanathan ............... H04L 49/505 370/235 |
| 2015/0271075 A1 | 9/2015 | Zhang et al. |
| 2016/0028620 A1* | 1/2016 | Hari ............... H04L 45/60 370/389 |
| 2016/0065477 A1* | 3/2016 | White ............... H04L 43/0882 370/237 |
| 2017/0214738 A1 | 7/2017 | Agarwal et al. |
| 2018/0063007 A1* | 3/2018 | Johnson ............... H04L 49/50 |
| 2018/0091427 A1* | 3/2018 | Kumar ............... H04L 47/24 |
| 2018/0146030 A1 | 5/2018 | Weng et al. |
| 2018/0176153 A1 | 6/2018 | Reumann et al. |
| 2018/0234340 A1 | 8/2018 | Kim et al. |
| 2019/0037033 A1 | 1/2019 | Khakimov et al. |
| 2019/0058655 A1 | 2/2019 | McDonald |
| 2020/0162421 A1 | 5/2020 | Lo et al. |

OTHER PUBLICATIONS

IEEE Standard 802.1AX-2014 (Revision of IEEE Standard 802.1AX-2008)—IEEE Standard for Local and metropolitan area networks—Link Aggregation, pp. 1-344, Dec. 10, 2014.

ISO/IEC 7498-1—International Standard—"Information technology—Open Systems Interconnection—Basic Reference Model: The Basic Model", pp. 1-68, Jun. 15, 1996.

Patel et al., "Ananta: Cloud Scale Load Balancing", SIGCOMM'13, pp. 207-218, Hong Kong, China, Aug. 12-16, 2013.

Wikipedia—Virtual IP address, pp. 1-2, Mar. 7, 2018 (Retrieved from "https://en.wikipedia.org/w/index.php?title=Virtual_IP_address&oldid=829269317").

Gandhi et al., "Duet: Cloud Scale Load Balancing with Hardware and Software", SIGCOMM'14, pp. 1-12, Chicago, USA, Aug. 17-22, 2014.

Miao et al., "SilkRoad: Making Stateful Layer-4 Load Balancing Fast and Cheap Using Switching ASICs", SIGCOMM'17, pp. 1-14, Los Angeles, USA, Aug. 21-25, 2017.

Mellanox Indigo™ NPS-400™ Network Processor, Product Brief, pp. 1-3, year 2017.

Mellanox Spectrum™ Ethernet Switch IC, Product Brief, pp. 1-2, year 2017.

U.S. Appl. No. 16/194,343 office action dated Jul. 1, 2020.

\* cited by examiner

LOAD BALANCING AMONG NETWORK LINKS USING AN EFFICIENT FORWARDING SCHEME

TECHNICAL FIELD

Embodiments described herein relate generally to communication networks, and particularly to methods and systems for load-balanced packet transmission.

BACKGROUND

Various packet networks employ dynamic load balancing for handling time-varying traffic patterns and network scaling. Methods for load balancing implemented at the router or switch level are known in the art. For example, U.S. Pat. No. 8,014,278 describes a packet network device that has multiple equal output paths for at least some traffic flows. The device adjusts load between the paths using a structure that has more entries than the number of equal output paths, with at least some of the output paths appearing as entries in the structure more than once. By adjusting the frequency and/or order of the entries, the device can effect changes in the portion of the traffic flows directed to each of the equal output paths.

U.S. Pat. No. 8,514,700 describes a method for selecting a link for transmitting a data packet, from links of a Multi-Link Point-to-Point Protocol (MLPPP) bundle, by compiling a list of links having a minimum queue depth and selecting the link in a round robin manner from the list. Some embodiments of the invention further provide for a flag to indicate if the selected link has been assigned to a transmitter so that an appropriate link will be selected even if link queue depth status is not current.

In some communication networks, multiple network links are grouped together using a suitable protocol. For example, the Equal-Cost Multi-Path (ECMP) protocol is a routing protocol for forwarding packets from a router to a destination over multiple possible paths. ECMP is described, for example, by the Internet Engineering Task force (IETF) in a Request for Comments (RFC) 2991, entitled "Multipath Issues in Unicast and Multicast Next-Hop Selection," November 2000.

The throughput over a point-to-point link can be increased by aggregating multiple connections in parallel. A Link Aggregation Group (LAG) defines a group of multiple physical ports serving together as a single high-bandwidth data path, by distributing the traffic load among the member ports of the LAG. The Link Aggregation Control Protocol (LACP) for LAG is described, for example, in "IEEE Standard 802.1AX-2014 (Revision of IEEE Standard 802.1AX-2008)—IEEE Standard for Local and metropolitan area networks—Link Aggregation," Dec. 24, 2014.

SUMMARY

An embodiment that is described herein provides a network element that includes multiple output ports and circuitry. The multiple output ports are configured to transmit packets over multiple respective network links of a communication network. The circuitry is configured to receive from the communication network, via one or more input ports of the network element, packets that are destined for transmission via the multiple output ports, to monitor multiple data-counts, each data-count corresponding to a respective output port, and is indicative of a respective data volume of the packets forwarded for transmission via the respective output port, to select for a given packet, based on the data-counts, an output port among the multiple output ports, and to forward the given packet for transmission via the selected output port.

In some embodiments, the circuitry is configured to select the output port in accordance with a criterion that aims to distribute traffic evenly among the multiple output ports. In other embodiments, the circuitry is configured to select the output port to which a minimal amount of data has been forwarded, among the multiple output ports, in a recent interval. In yet other embodiments, the circuitry is configured to select the output port by determining an amount of data to be transmitted via the selected output port before switching to a different output port.

In an embodiment, the circuitry is configured to assign to the multiple output ports multiple respective weights, and to distribute traffic among the multiple output ports based on the assigned weights. In another embodiment, first and second output ports are coupled to respective first and second network links that support respective first and second different line-rates, and the circuitry is configured to select the first output port or the second output port based at least on the first and second line-rates. In yet another embodiment, the circuitry is configured to select the output port in accordance with a predefined cyclic order among the multiple output ports.

In some embodiments, the packets destined to the multiple output ports belong to a given traffic type, and the circuitry is configured to select the output port based at least on the given traffic type. In other embodiments, the circuitry is configured to select the output port by refraining from forwarding to a given output port packets of a priority level for which the given output port is paused or slowed down by flow control signaling imposed by a next-hop network element. In yet other embodiments, the circuitry is configured to assign a packet-flow to a given output port, and to re-assign the packet-flow to a different output port in response to detecting that a time that elapsed since receiving a recent packet of the packet-flow exceeds a predefined period.

In an embodiment, the packets destined to the multiple output ports have different respective delivery priorities, and the circuitry is configured to select the output port based at least on the delivery priority of a packet destined to the multiple output ports. In another embodiment, the multiple output ports belong to a first load-balancing group and to a second load-balancing group, so that at least one output port has a respective data-count that is shared by both the first and second load-balancing groups, and the circuitry is configured to select an output port in the first load-balancing group based on the shared data-count while taking into consideration a port selection decision carried out previously for the second load-balancing group.

There is additionally provided, in accordance with an embodiment that is described herein, a method including, in a network element, transmitting packets via multiple output ports of the network element over multiple respective links of a communication network. Packets that are destined for transmission via the multiple output ports are received from the communication network, via one or more input ports of the network element. Multiple data-counts are monitored, each data-count corresponding to a respective output port, and is indicative of a respective data volume of the packets forwarded for transmission via the respective output port. Based on the data-counts, an output port is selected among the multiple output ports for a given packet, and the given packet is forwarded for transmission via the selected output port, wherein the selecting of the output port is performed based on selection rules, and wherein different selection rules are used for different traffic types.

Optionally, different selection rules are used for traffic of different transport protocols. Optionally, selecting the output port comprises selecting the output port in accordance with a criterion that aims to distribute traffic evenly among the multiple output ports. Optionally, selecting the output port comprises selecting an output port to which a minimal amount of data has been forwarded, among the multiple output ports, in a recent interval. Optionally, selecting the output port comprises determining an amount of data to be transmitted via the selected output port before switching to a different output port. Optionally, the method includes assigning to the multiple output ports multiple respective weights, and distributing traffic among the multiple output ports based on the assigned weights. Optionally, first and second output ports are coupled to respective first and second network links that support respective first and second different line-rates, and wherein selecting the output port comprises selecting the first output port or the second output port based at least on the first and second line-rates.

Optionally, selecting the output port comprises selecting the output port in accordance with a predefined cyclic order among the multiple output ports. Optionally, the packets destined to the multiple output ports belong to a given traffic type, and wherein selecting the output port comprises selecting the output port based at least on the given traffic type. Optionally, selecting the output port comprises refraining from forwarding to a given output port packets of a priority level for which the given output port is paused or slowed down by flow control signaling imposed by a next-hop network element. Optionally, the method includes assigning a packet-flow to a given output port, and re-assigning the packet-flow to a different output port in response to detecting that a time that elapsed since receiving a recent packet of the packet-flow exceeds a predefined period.

Optionally, the packets destined to the multiple output ports have different respective delivery priorities, and wherein selecting the output port comprises selecting the output port based at least on the delivery priority of a packet destined to the multiple output ports. Optionally, the multiple output ports belong to a first load-balancing group and to a second load-balancing group, wherein at least one output port has a respective data-count that is shared by both the first and second load-balancing groups, and wherein selecting the output port comprises selecting an output port in the first load-balancing group based on the shared data-count while taking into consideration a port selection decision carried out previously for the second load-balancing group.

There is additionally provided, in accordance with an embodiment that is described herein, a network element, including one or more input ports, multiple output ports, configured to transmit packets over multiple respective network links of a communication network, a plurality of counters, and a plurality of load balancers, each load balancer configured to distribute packets from at least one of the one or more input ports between a respective sub-group of the output ports associated with the load balancer. Each load balancer is configured to manage, for each of the output ports associated with the load balancer, in respective counters of the plurality of counters, a data-count indicative of a respective data volume of the packets forwarded for transmission through the output port by the load balancer, and the load balancers are configured to select output ports for the packets, responsively to the data-counts.

Optionally, the load balancers are configured to select the output ports in accordance with a criterion that aims to distribute traffic evenly among the sub-group of the output ports associated with the load balancer. Optionally, at least one of the load balancers is configured with respective weights for each of the outport ports in the sub-group of the output ports associated with the load balancer, and to distribute packets among the sub-group of the output ports associated with the load balancer based on the assigned weights. Optionally, the load balancers are configured to select for each packet, the output port to which a minimal amount of data has been forwarded, among the sub-group of the output ports associated with the load balancer.

Optionally, first and second output ports are coupled to respective first and second network links that support respective first and second different line-rates, and wherein the load balancers are configured to select the first output port or the second output port based at least on the first and second line-rates. Optionally, the load balancers are configured to select an output port responsively to the data-counts periodically, while between the selections based on the data-counts, the output port is selected without relation to the data-counts. Optionally, the load balancers are configured to repeatedly use previously selected output ports, between the selections based on the data-counts.

Optionally, the load balancers are configured to select the output ports in a cyclic order, between the selections based on the data-counts. Optionally, the packets destined to the multiple output ports belong to a plurality of different traffic types, and wherein the load balancers are configured to select the output port based on the data-counts at different rates for packets of different types. Optionally, the packets destined to the multiple output ports belong to a plurality of different traffic types, and wherein the load balancers are configured to select the output ports for packets of different types based on different selection methods, between the selections based on the data-counts. Optionally, the packets destined to the multiple output ports have different respective delivery priorities, and wherein the load balancers are configured to select the output port for all packets identified as having a high priority based on the data-counts, while the output port for packets having a lower priority are selected based on the data-counts, only periodically.

Optionally, the network element includes circuitry which manages state information for flows of packets and wherein the state information of a flow indicates a rule as to how an output port is to be selected for packets belonging to the flow, when the selection is performed without relation to the data-counts. Optionally, the network element includes circuitry which manages state information for flows of packets and wherein the state information of a flow indicates a rule as to when the selection is performed without relation to the data-counts. Optionally, the load balancers are configured to pause or slow down delivery of packets to output ports responsively to flow control signaling imposed by a next-hop network element, and wherein after the pause or slow down is over, the load balancers are configured to advance the data-count of ports which were paused or slowed down to compensate for the time in which the port was paused or slowed down.

Optionally, the load balancers are configured to advance the data-count of ports which were paused or slowed down to a minimum, average or maximum of the data-counts of other output ports in the sub-group of the output ports to which the data-count belongs. Optionally, the packets destined to the multiple output ports have different respective delivery priorities, and wherein the load balancers are configured to select the output port based at least on the delivery priority of a packet destined to the multiple output ports.

There is additionally provided, in accordance with an embodiment that is described herein, a network element, comprising multiple output ports, configured to transmit packets over multiple respective network links of a communication network; and circuitry, configured to receive from the communication network, via one or more input ports of the network element, packets that are destined for transmission via the multiple output ports, monitor multiple data-counts, each data-count corresponding to a respective output port, and is indicative of a respective data volume of the packets forwarded for transmission via the respective output port; and select for each received packet an output port among the multiple output ports, and forward the given packet for transmission via the selected output port. The circuitry is configured to select an output port responsively to the data-counts periodically, while between the selections based on the data-counts, the output port is selected without relation to the data-counts.

Optionally, the load balancers are configured to select an output port responsively to the data-counts for less than 10% of the packets handled by the load balancer. Optionally, load balancers are configured to repeatedly use previously selected output ports, between the selections based on the data-counts. Optionally, the load balancers are configured to select the output ports in a cyclic order, between the selections based on the data-counts. Optionally, the packets destined to the multiple output ports belong to a plurality of different traffic types, and wherein the load balancers are configured to select the output port based on the data-counts at different rates for packets of different types. Optionally, the packets destined to the multiple output ports belong to a plurality of different traffic types, and wherein the load balancers are configured to select the output ports for packets of different types based on different selection methods, between the selections based on the data-counts.

Optionally, the packets destined to the multiple output ports have different respective delivery priorities, and wherein the load balancers are configured to select the output port for all packets identified as having a high priority based on the data-counts, while the output port for packets having a lower priority are selected based on the data-counts, only periodically. These and other embodiments will be more fully understood from the following detailed description of the embodiments thereof, taken together with the drawings in which:

DETAILED DESCRIPTION OF EMBODIMENTS

Overview

Traffic distribution can be implemented by individual network elements such as a switch or router by making on-the-fly decisions as to the network links via which to transmit packets toward their destination.

Embodiments that are described herein provide improved methods and systems for efficient balancing of traffic forwarded for transmission via multiple network links.

In principle, a network element could distribute traffic among multiple output ports by applying a hash function to certain fields in the headers of packets to be transmitted, and directing each packet to an output port selected based on the hash result. Hash-based load balancing of this sort relies, however, on handling a very large number of packet-flows. Moreover, a high-bandwidth packet-flow may cause non-uniform traffic distribution that is biased to its own output port. In the context of the present disclosure, the term "packet-flow" or simply "flow" for brevity, refers to a sequence of packets sent from a source to a destination over the packet network. Optionally, flows are identified by a 5-tuple of source address, destination address, source port, destination port, and protocol, as is known in the art.

Adaptive routing is a method according to which a network element selects a different route or path to the destination among multiple possible paths, e.g., in response to detecting congestion or link failure. Since routing decisions depend on queues occupancies that change dynamically, adaptive routing typically suffers from convergence and stability issues.

In another load-balancing method, a network element allocates multiple portions of the available bandwidth to multiple respective flows. This approach typically requires storing large amounts of state information. Moreover, such a load-balancing method typically involves long convergence times in response to changes that may occur in the traffic pattern. In yet another load-balancing method, the network element fragments each packet to small frames to be transmitted to the destination over multiple paths. Breaking the packets to frames improves load-balancing resolution, but the receiving end needs to re-assemble the frames to recover the packets. This approach is costly to implement because it requires large buffers. Moreover handling fragmentation adds latency in processing the packets.

In the disclosed embodiments, a network element assigns a group of multiple output ports for transmitting packets over multiple respective network links. The output ports assigned to the group are also referred to as "member ports" of that group. In the context of the present disclosure, the term "network link" (or simply "link" for brevity) refers to a physical point-to-point connection between components in the network such as network elements and network nodes. The network link provides mechanical and electrical coupling between the ports connected to that network link.

In some embodiments, the network element comprises a forwarding module that receives packets destined to the group and distributes the traffic among the member ports of the group. The network element monitors multiple data-counts, each data-count corresponding to a respective output port, and is indicative of a respective data volume of the packets forwarded for transmission via the respective output port. Alternatively, packet count can also be used, but may be insufficiently accurate when the packets differ in size. Based on the data-counts, the forwarding module selects for a given packet a member port, and forwards the given packet for transmission via the selected member port. The forwarding module selects the member port in accordance with a criterion that aims to distribute traffic evenly among the member ports of the group. To balance the load, the forwarding module determines the amount of data to be forwarded for transmission via the selected member port before switching to a different member port.

In some embodiments, the network element manages separate counters for each load balancer. That is, for each load balancer, a separate counter is managed for each output port. In some cases, the network element includes more than 10, more than 20 or even more than 40 load balancers, and altogether manages more than 100, more than 200 or even more than 500 counters. While managing such a large number of counters adds to the complexity of the network element, applicant has found that the gain from the simplicity of the load balancing based on the counters, and the performance and predictability gain in the network relative to a distribution based on a hash function on the headers of the packets, outweigh the extra complexity incurred by managing the counters.

In an embodiment, the forwarding module assigns to the member ports respective weights, and distributes traffic among the member ports based on the assigned weights.

In some embodiments, the member ports are coupled to network links that may support different line-rates. In such embodiments, the forwarding module distributes the traffic for transmission via the member ports in accordance with the respective line-rates. Optionally, the respective weights of the member ports are assigned according to the respective line-rates, in a manner which achieves a distribution of the packets according to the line-rates of the ports.

In some embodiments, the counters are consulted by the network element in the handling of each packet. In other embodiments, the counters are consulted only periodically, and when the counters are not consulted other considerations are used in selecting the output port. For example, once every predetermined number of packets the selection of the port is performed based on the respective counters of the ports. The predetermined number of packets is optionally greater than 10, greater than 50 or even greater than 100. In some embodiments, the predetermined number of packets is smaller than 1000, smaller than 200 or even smaller than 100. In some embodiments, when a port is selected based on the counters, in addition to selecting the port for the current packet, an assessment is made as to the difference between the counter values. If the difference (optionally as weighted by the weights assigned to the ports) is greater than a predetermined value, the next packet is also selected based on the counters, until the difference between the counters is smaller than the predetermined value.

For packets handled without consulting the counters, the forwarding module may select a member port of the group in any suitable order such as, for example, a predefined cyclic order, or randomly. In some embodiments, when not using the counters, the member port for the current packet is selected as the same as the port selected for the previous packet. The periodic handling of packets using the counters will generally smooth out the distribution of the packets between the output ports, so as to compensate for differences between lengths of the packets, for example.

In some embodiments, the forwarding module supports different selection rules for different traffic types or communication protocols, such as RoCE, TCP, UDP and, in general, various L4 source or destination ports. In such embodiments, the forwarding module selects the member port using the selection rule associated with the traffic type of the packets destined to the group. In some embodiments, the forwarding module uses different rules for deciding whether the counters should be used in forwarding a specific packet. For example, for packets of a first protocol (e.g., UDP), a decision based on the counters may be performed every first number of packets (e.g., every 10 packets), while for a second protocol (e.g., TCP), a decision based on the counters is performed every second number of packets (e.g., every 100 packets), where the second number is greater than the first number. Alternatively or additionally, the rules which govern the forwarding of packets when not using the counters, are different for different protocols. In some embodiments, packets of a first protocol (e.g., UDP), are distributed cyclically between the ports when the counters are not consulted, while packets of a second protocol (e.g., TCP), are transmitted through the same port as the previous packet. Different forwarding rules are used, in some embodiments, for different packet-flows.

Alternatively or additionally, different forwarding rules are used for packets of different priorities. Optionally, for packets of high priority, the forwarding element consults the counters at a higher rate relative to the rate at which the counters are consulted for lower priority packets. In some embodiments, the counters are consulted for every high priority packet.

In some embodiments, the network element manages flow control with other network elements. In some of these embodiments, after a member port is paused or slowed down by flow control signaling imposed by a next-hop network element, the counter of the port is adjusted to compensate for the time in which it was inactive, without overloading the port due to its low counter.

In the disclosed techniques, a network element evenly distributes traffic over multiple network links at a packet resolution, i.e., on an individual packet-by-packet basis, using state information that occupies only a small storage space. The distribution scheme employed is based mainly on counting the data volume or throughput forwarded for transmission via each of the multiple network links. As such, the distribution scheme is efficient and flexible, and is not tied to specific packet-flows. In addition, the disclosed techniques allow affordable network scaling, and are free of convergence issues.

System Description

Figure 1:
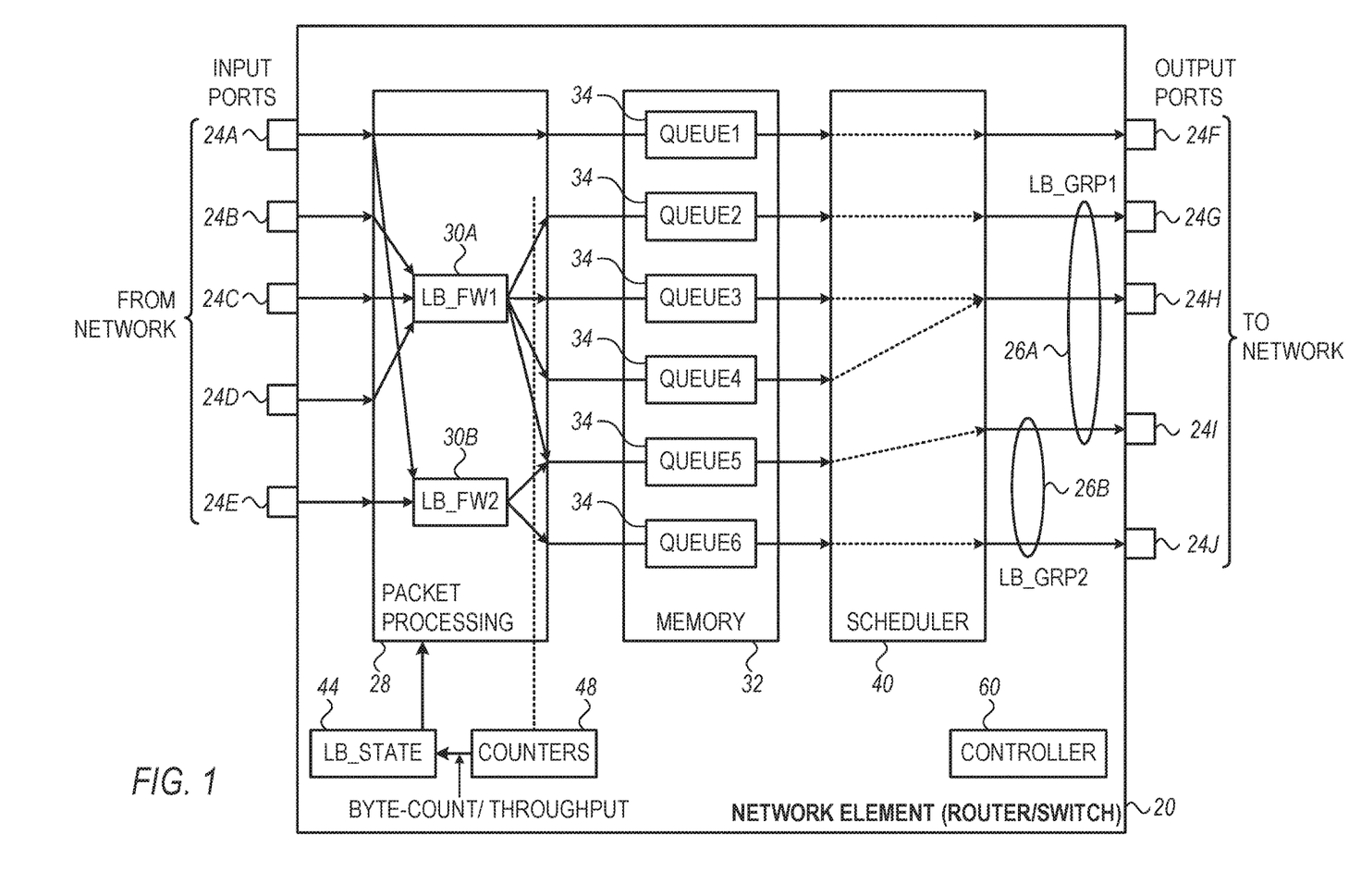
FIG. 1 is a block diagram that schematically illustrates a network element that supports load balancing, in accordance with an embodiment that is described herein.

FIG. 1 is a block diagram that schematically illustrates a network element 20 that supports load balancing, in accordance with an embodiment that is described herein. Network element 20 may be a building block in any suitable communication network such as, for example, an InfiniBand (IB) switch fabric, or packet networks of other sorts, such as Ethernet or Internet Protocol (IP) networks. Alternatively, network element 20 may be comprised in a communication network that operates in accordance with any other suitable standard or protocol. Typically, multiple network elements such as network element 20 interconnect to build the communication network. The communication network to which network element belongs may be used, for example, to connect among multiple computing nodes or servers in a data center application.

Although in the description that follows we mainly refer to a network switch or router, the disclosed techniques are applicable to other suitable types of network elements such as, for example, a bridge, gateway, or any other suitable type of network element.

In the present example, network element 20 comprises multiple ports 24 for exchanging packets with the communication network. In some embodiments, a given port 24 functions both as an input port for receiving from the communication network incoming packets and as an output port for transmitting to the communication network outgoing packets. Alternatively, a port 24 can function as either input port or output port. An input port is also referred to as an "ingress interface" and an output port is also referred to as an "egress interface."

In the example of FIG. 1, the ports denoted 24A-24E function as input ports, and the ports denoted 24F-24J function as output ports. In addition, the output ports denoted 24G, 24H and 24I are organized in a load-balancing group 26A denoted LB_GRP1, and output ports 24I and 24J are organized in another load-balancing group 26B denoted LB_GRP2. The output ports assigned to a load-balancing group are also referred to as "member ports" of that group. Note that in the present example, output port 24I is shared by both LB_GRP1 and LB_GRP2. This configuration, however, is not mandatory, and in alternative embodiments, load-balancing groups may be fully separated without sharing any output ports with one another.

Load-balancing groups 26A and 26B can be defined in various ways. For example, when the network element is an L2 element in accordance with the Open Systems Interconnection (OSI) model, e.g., a switch, the load-balancing group may be defined as a Link Aggregation Group (LAG). Alternatively, when the network element is an L3 element in accordance with the OSI model, e.g., a router, the load-balancing group may be defined in accordance with the Equal-Cost Multi-Path (ECMP) protocol. Further alternatively, other types of port-groups, defined in accordance with any other suitable protocol, can also be used. Further alternatively, the load-balancing groups such as 26A and 26B can be defined using any other suitable model or protocol. In general, different load-balancing groups may be defined in accordance with different respective grouping protocols.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Packets received from the communication network via input ports 24A-24E are processed using a packet processing module 28. Packet processing module 28 applies to the received packets various ingress processing tasks, such as verifying the integrity of the data in the packet, packet classification and prioritization, access control and/or routing. Packet processing module 28 typically checks certain fields in the headers of the incoming packets for these purposes. The header fields comprise, for example, addressing information, such as source and destination addresses and port numbers, and the underlying network protocol used.

Network element 20 comprises a memory 32 for storing in queues 34 packets that were forwarded by the packet processing module and are awaiting transmission to the communication network via the output ports. Memory 32 may comprise any suitable memory such as, for example, a Random Access Memory (RAM) of any suitable storage technology.

Packet processing module 28 forwards each processed packet (that was not dropped) to one of queues 34 denoted QUEUE1 . . . QUEUE6 in memory 32. In the present example, packet processing module 28 forwards to QUEUE1 packets that are destined for transmission via output port 24F, to QUEUE2 . . . QUEUE5 packets destined for transmission via output ports 24G-24I of load-balancing group 26A, and forwards to QUEUE5 and QUEUE6 packets destined for transmission via output ports 24I and 24J of load-balancing group 26B. In some embodiments, queues 34 are managed in memory 32 using shared memory or shared buffer techniques.

In the example of FIG. 1, QUEUE1 stores packets received via input port 24A, QUEUE2 . . . QUEUE5 store packets received via input ports 24B . . . 24D, and QUEUE5 and QUEUE6 store packers received via input ports 24A and 24E. In the embodiment of FIG. 1, packets from a single input port are directed to only a single queue 34 or a single load balancer 30. In other embodiments, packets from one or more input ports 24 are distributed between a plurality of load balancers 30, queues 34, and/or between one or more queues 34 and one or more load balancers 30. The load balancer 30 and/or queue 34 receiving any specific packet is selected according to MAC switching logic, IP routing logic, randomly, by round robin and/or any other suitable distribution mechanism. In some embodiments, the load balancer 30 and/or queue 34 receiving any specific packet are selected responsive to the flow to which the packet belongs. Optionally, processing module 28 manages a database with a state for each flow. For each received packet, the database is consulted based on the flow to which the packet belongs and accordingly the packet is handled.

Packet processing module 28 comprises forwarding modules 30A and 30B denoted LB_FW1 and LB_FW2, respectively. LB_FW1 distributes packets that were received via input ports 24B . . . 24D among the output ports of LB_GRP1 via QUEUE2 . . . QUEUE5, and LB_FW2 distributes packets received via input ports 24A and 24E among the output ports of LB_GRP2.

A load-balancing state 44 denoted LB_STATE stores updated data-counts counted per output port (at least of the load-balancing groups) using multiple respective counters in a counter array 48. The data-counts are indicative of the amount of data (or throughput) forwarded by LB_FW1 and LB_FW_2 toward the respective output ports. State 44 may store additional information as will be described below. Each of modules LB_FW1 and LB_FW2 uses the load-balancing state information associated with the respective load-balancing group to make forwarding decisions that result in distributing the traffic within each load-balancing group in a balanced manner.

Network element 20 comprises a scheduler 40 that schedules the transmission of packets from QUEUE1 via output port 24F, from QUEUE2 . . . QUEUE5 via output ports 24G . . . 24I that were assigned to LB_GRP1, and from QUEUE5 and QUEUE6 via output ports 24I and 24G that were assigned to LB_GRP2. In some embodiments, scheduler 40 empties the queues coupled to a given port at the maximal allowed rate, i.e., up to the line-rate of the network link to which the output port connects.

In the present example, the scheduler transmits packets from both QUEUE3 and QUEUE4 via port 24H. Scheduler 40 may schedule the transmission from QUEUE3 and QUEUE4 so as to share the bandwidth available over the network link coupled to output port 24H using any suitable scheduling scheme such as, for example, a Round-Robin (RR), Weighted Round-Robin (WRR) or Deficit Round Robin (DRR) scheme.

Although in network element 20, counters in counter array 48 have a byte count-resolution, i.e., the counter increments by one for each byte transmitted, in alternative embodiments, any other count-resolution such as, for example, a single-bit count-resolution or a 16-bit count-resolution can also be used. Further alternatively, different count-resolutions for different counters in counter array 48 can also be used.

Network element 20 comprises a controller 60 that manages various functions of the network element. In some embodiments, controller 60 configures one or more of packet processing module 28, load-balancing forwarding modules 30, scheduler 40, and LB_STATE 44. In an example embodiment, controller 60 configures the operation of LB_FW1 and LB_FW2 (e.g., using the LB_STATE) by defining respective forwarding rules to be applied to incoming packets. The controller may also define one or more load-balancing groups and associate these groups with respective queues 34. In some embodiments, controller 60 configures scheduler 40 with scheduling rules that scheduler 40 may use for transmitting queued packets via the output ports.

The configurations of network element 20 in FIG. 1 and of the underlying communication network are example configurations, which are chosen purely for the sake of conceptual clarity. In alternative embodiments, any other suitable network element and communication network configurations can also be used. Some elements of network element 20, such as packet processing module 28 and scheduler 40, may be implemented in hardware, e.g., in one or more Application-Specific Integrated Circuits (ASICs) or Field-Programmable Gate Arrays (FPGAs). Additionally or alternatively, some elements of the network element can be implemented using software, or using a combination of hardware and software elements. Memory 32 comprises one or more memories such as, for example, Random Access Memories (RAMs).

In some embodiments, some of the functions of packet processing module 28, scheduler 40 or both may be carried out by a general-purpose processor (e.g., controller 60), which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present patent application and in the claims, the term "circuitry" refers to all the elements of network element 20 excluding ports 24. In FIG. 1, the circuitry comprises packet processing module 28, scheduler 40, LB_STATE 44, counter array 48, controller 60, and memory 32. While counter array 48 is shown as a single block, the counters may all be located in proximity to each other in a single location or they may be distributed in different locations, for example in proximity to corresponding load balancers.

Load Balancing Using an Efficient Forwarding Scheme

Figure 2:
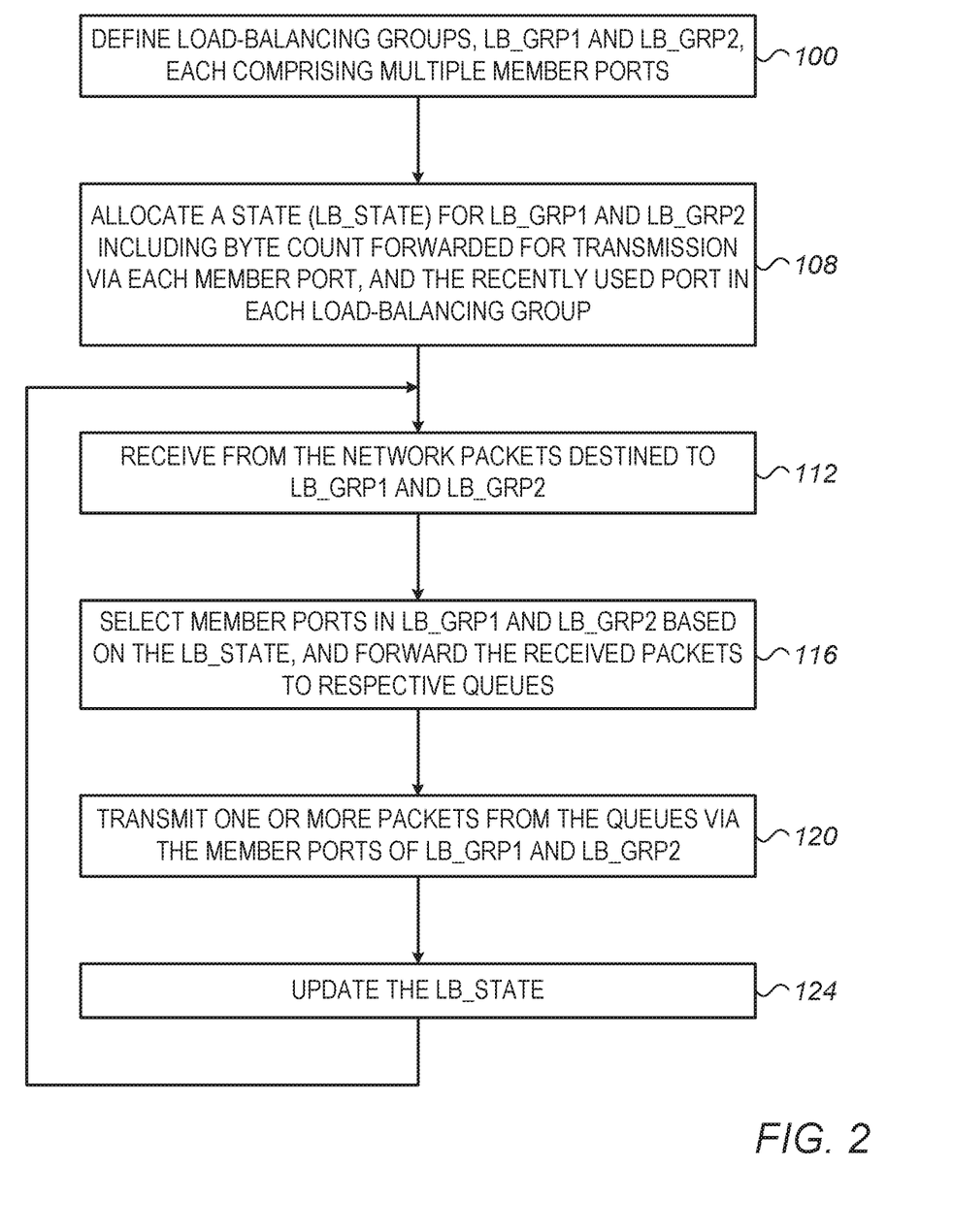
FIG. 2 is a flow chart that schematically illustrates a method for load balancing using an efficient forwarding scheme, in accordance with an embodiment that is described herein.

FIG. 2 is a flow chart that schematically illustrates a method for load balancing using an efficient forwarding scheme, in accordance with an embodiment that is described herein. The method may be executed jointly by the elements of network element 20 of FIG. 1, including scheduler 40.

The method begins with controller 60 of the network element defining one or more load-balancing groups that each comprises multiple respective output ports 24, at a load-balancing setup step 100. Controller 60 may receive the definition of the load-balancing groups from a network administrator using a suitable interface (not shown). In the present example, the controller defines load-balancing groups LB_GRP1 and LB_GRP2 of FIG. 1. Alternatively, a number of load-balancing groups other than two can also be used.

In some embodiments, the controller defines the load-balancing groups using a suitable protocol. For example, when the network element is a L3-router, the controller may define the load-balancing groups using the ECMP protocol cited above. Alternatively, when the network element is a L2-switch, the controller may define the load-balancing groups using a suitable LAG protocol such as the Link Aggregation Control Protocol (LACP) cited above. In some embodiments, all of the member ports in each load-balancing group have respective paths to a common destination node or to a common next-hop network element.

At a state allocation step 108, the controller allocates for load-balancing groups 26A and 26B a state denoted LB_STATE, e.g., load-balancing state 44 of FIG. 1. Controller 60 may allocate the LB_STATE in memory 32 or in another memory of the network element (not shown). The state information in LB_STATE 44 includes the data volume (e.g., in bytes) and/or throughput (e.g., in bits per second) forwarded to each of the member ports of load-balancing groups LB_GRP1 and LB_GRP2 during some time interval. The LB_STATE additionally stores the identity of the member port recently selected in each load-balancing group, the queue (34) associated with the selected output port, or both. In some embodiments, the LB_STATE stores one or more port-selection rules (or forwarding rules) that each of modules LB_FW1 and LB_FW2 may apply in selecting a subsequent member port and respective queue, and for determining the amount of data to forward to the queue(s) of the selected member port before switching to another member port.

Optionally, states are managed for each packet flow. The state of each flow optionally indicates the output port to which the previous packet of the flow was forwarded and a rule as to how the packets of the flow are to be handled. In some embodiments, the state indicates a time at which a previous packet of the flow was handled. This time is optionally used in deciding whether to consult the counters in deciding to which output port to forward packets of the flow. In some embodiments, if less than a predetermined period passed since a previous packet of the flow was handled, the current packet is forwarded without consulting the data-counts of the output ports.

At a reception step 112, packet processing module 28 receives via input ports 24B-24E packets that are destined for transmission via the member ports of load-balancing groups LB_GRP1 and LB_GRP2. A given packet is typically destined to only one of the load-balancing groups. The packet processing module processes the incoming packets, e.g., based on certain information carried in the packets' headers. Following processing, modules LB_FW1 and LB_FW2 of the packet processing module forward the processed packets to relevant queues 34 to be transmitted to the communication network using scheduler 40, using efficient forwarding schemes as described herein.

At a port selection step 116, each of modules LB_FW1 and LB_FW2 that receives a packet selects a member port of the respective load-balancing group LB_GRP1 or LB_GRP2 based on the LB_STATE. Given the state information such as the data volume and/or throughput forwarded in a recent time interval to the queues of the member ports in each load-balancing group, each forwarding module selects a subsequent member port so that on average the bandwidth of outgoing traffic via each of the load-balancing groups is distributed evenly (or approximately evenly) among the respective member ports.

In some embodiments, LB_FW1 and LB_FW2 may make selection decisions in parallel. Alternatively, LB_FW1 and LB_FW2 share a common decision engine (not shown) and therefore LB_FW1 and LB_FW2 may operate serially, or using some other suitable method of sharing the decision engine.

Forwarding modules LB_FW1 and LB_FW2 may select a subsequent member port for forwarding in various ways. For example, a forwarding module may select the member ports in some sequential cyclic order. Alternatively, the forwarding module may select a subsequent member port randomly.

In some embodiments, each of LB_FW1 and LB_FW2 checks the amount of data forwarded to each of the respective member ports in a recent interval, and selects the member port to which the minimal amount of data was forwarded during that interval.

In some embodiments, each forwarding module 30 applies different selection rules (or forwarding rules) depending on the type of traffic or communication protocol destined to the respective load-balancing group. For example, the forwarding module may use different selection rules for different traffic types such as, for example, Remote Direct Memory Access (RDMA) over Converged Ethernet (RoCE), Transmission Control Protocol (TCP), User Datagram Protocol (UDP), L4 ports, or any other suitable traffic type or communication protocol.

Optionally, for packets belonging to connection-based protocols (e.g., TCP), forwarding module 30 consults the data-counts less often than for packets belonging to connectionless protocols (e.g., UDP). For example, in one embodiment, packets of connection-based protocols are forwarded without relation to the data-counts of the output ports, while forwarding module 30 consults the data-counts in selecting output ports for at least some of the packets of connectionless protocols. Alternatively, forwarding module 30 consults the data-counts at a low rate (e.g., less than every 100 packets) in handling packets of connection-based protocols, while forwarding module 30 consults the data-counts at a high rate (e.g., more than every 20 packets, more than every 5 packets) in handling packets of connectionless protocols.

In some embodiments, a forwarding module 30 distributes the traffic among the member ports of the respective load-balancing group by assigning to the member ports respective weights. The weights can be predefined or determined adaptively. For example, in some applications, the member ports of the underlying load-balancing group are coupled to network links having different line-rate speeds. In such embodiments, the forwarding module distributes the traffic to be transmitted via the load-balancing group by assigning higher weights to output ports coupled to faster network links.

Optionally, a port A which is intended to receive half as much traffic as a port B is assigned a weight which is half the weight assigned to port B. In relating to the counter values, forwarding module optionally first divides each counter value by its respective rate and then selects a port based on the results of the division. Alternatively, other calculations of similar results may be used. For example, port A may be assigned a weight which is inversely proportional to its capacity and the weighted counter values are calculated by multiplication.

In some embodiments, in selecting a subsequent member port, the forwarding module takes into consideration a priority criterion such as, for example, a packet class, delivery priority or quality of service level assigned to the packets. For example, packets having high delivery priorities may be assigned to be transmitted via member ports coupled to network links having high line-rates. In an example embodiment, the forwarding module forwards packets that require low latency to queues associated with ports of fast network links.

In the example of FIG. 1, packets destined to LB_GRP1 may have different priority levels, in an embodiment. In this embodiment, when module LB_FW1 selects output port 24H, LB_FW1 forwards high priority packets, e.g., to QUEUE3 and low priority packets to QUEUE4. Scheduler 40 then empties QUEUE3 with higher priority than QUEUE4.

In some embodiments, when a member port is paused or slowed down due to flow control signaling from the next-hop network element, the forwarding module excludes the queue(s) of that member port from being selected until the flow via the port resumes. In some embodiments, the pause signaling applies only to a specific priority level. In such embodiments, forwarding module 30 excludes the paused port from being selected for packets of the specific priority level, but may forward packets of other priority levels to the queue(s) of the paused port.

Optionally, when the pause or slow down is over, the respective counter(s) of the member port are updated to compensate for the pause or slow down period. In some embodiments, each counter of the paused or slowed down port is updated to the average counter value of the counter values of the other output ports in the group to which the counter belongs. Alternatively, the counters of the of the paused or slowed down port are updated to any other value which is a function of the other counters in the group to which the updated counter belongs, such as the minimum or maximum of the other counters. In some embodiments, port selection is performed for each received packet, based on the counter values, without relation to previous selected ports. Alternatively, port selection based on the counter values is performed only periodically, and between port selections based on the counter values, packets are transmitted through the port that was most recently selected, or the port most recently selected for similar types of packets (e.g., packets with the same priority, packets of the same protocol, packets of the same flow). The forwarding module may transmit a predefined amount of data via a selected member port before switching to a subsequent member port, selected based on the counter values. Alternatively, the forwarding module adaptively determines the amount of data to be transmitted via a selected member port before switching to another member port, e.g., in accordance with varying traffic patterns.

In some embodiments, the packets destined to a particular load-balancing group belong to multiple different flows. In such embodiments, the forwarding module may assign to each of the member ports of that group one or more of these flows. The forwarding module may adapt the assignments of flows to member ports, e.g., in accordance with changes in the traffic patterns. In an embodiment, in order to retain packet delivery order for a given flow, the forwarding module is allowed to change the assignment of the given flow to a different member port when the time-interval that elapsed since receiving a recent packet of the given flow exceeds a predefined (e.g., configurable) period.

In some embodiments, the forwarding module decides to forward a packet of a given flow for transmission via a certain member port, e.g., to create a sequence of two or more packets of that flow transmitted contiguously via the same member port.

In some embodiments, an output port may be shared with multiple load-balancing groups. In the example of FIG. 1, port 24I is shared via QUEUE5 by both LB_GRP1 and LB_GRP2. In such embodiments, a common counter counts the data-count forwarded from both LB_FW1 and LB_FW2 to QUEUE5, which balances the transmission via port 24I in both LB_GRP1 and LB_GRP2. Sharing an output by multiple load-balancing groups is supported, for example, by the ECMP protocol. In embodiments of this sort, a port selection decision in one load-balancing group may affect a later port selection decision in the other load-balancing group. As such, in an embodiment, selecting an output port in one load-balancing group (e.g., LB_GRP1) based on the shared data-count is done while taking into consideration a port selection decision carried out previously for the other load-balancing group (LB_GRP2) that shares this data-count. Note that sharing an output port by multiple load-balancing groups is given by example and is not mandatory.

In other embodiments, separate counters are managed for each output port, for each load-balancing group. Counter array 48 optionally includes a plurality of counters for assignment to each load balancer (LB), for each of the queues (qu) to which the load balancer forwards packets. Accordingly, each pair of load balancer and queue (#LB, #Qu) has a separate counter. Optionally, when controller 60 configures a load balancer to distribute packets to a group of queues, a set of counters in counter array 48 is assigned to the load balancer 30, and each of the counters in the set is assigned to a respective one of the queues 34 assigned to the load balancer 30. Accordingly, some or all of queues 34 are associated with a plurality of counters according to the number of load balancers 30 which deliver packets to the queue 34.

Figure 3:
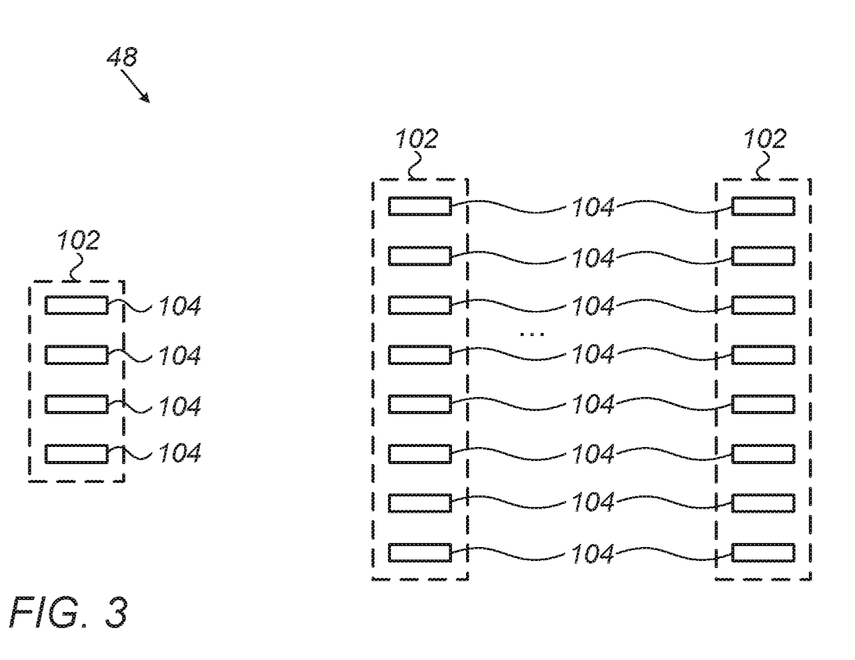
FIG. 3 is a schematic block diagram of a counter array, in accordance with an embodiment of the present invention.

FIG. 3 is a schematic block diagram of counter array 48, in accordance with an embodiment of the present invention. In the embodiment of FIG. 3, counter array 48 includes a plurality of sets 102 of counters 104. Each set 102 is associated with a respective load balancer 30 and includes a predetermined (or dynamically assigned) number of counters 104 which is expected to be the maximal number of queues 34 associated with a single load balancer 30. The predetermined number of counters 104 in each set 102 optionally includes at least four, at least or even at least 16. In other embodiments, counter array 48 includes counter sets 102 of a plurality of different sizes, and the counter sets 102 are assigned to the load balancers 30 according to the number of queues to which each specific load balancer 30 distributes packets. If a set 102 includes more counters 104 than required by the specific load balancer 30 to which the set is assigned, the remaining counters are not used.

Counter array 48 optionally includes at least 16, at least 32, at least 64 or even at least 96 counter sets 102.

Each counter 104 optionally includes at least 8 bits, at least 16 bits or even at least 24 bits. Optionally, the counters include less than 64 bits, for example 32 bits or fewer. In some embodiments, all the counters include the same number of bits. In other embodiments, different sets 102 have counters of different sizes. In some embodiments, the counter values are never cleared and their values simply wrap around when their maximal value is reached. Alternatively, the values of the counters of each set 102 are periodically reduced by a same value for all the counters of the set, to avoid wrap around of their value.

Instead of using fixed sets 102 of counters 104, which are assigned to a respective single load balancer, the counters 104 are assigned to ad hoc sets according to the number of counters that each load balancer requires.

At a transmission step 120, scheduler 40 transmits queued packets to the communication network via the output ports. Scheduler 40 may transmit one or more packets from QUEUE1 via port 24A, one or more packets QUEUE2-QUEUE5 via the member ports of LB_GRP1, and one or more packets from QUEUE5 and QUEUE6 via the member ports of LB_GRP2.

At a state updating step 124, the network element updates the LB_STATE in accordance with the byte-count and/or throughput measured using counters in counter array 48 associated with the recently used member ports in each load-balancing group. The scheduler also updates the load-balancing state by replacing the identity of the recently used member port with the identity of the selected member port. Following step 124 the method loops back to step 112 to receive subsequent packets.

The embodiments described above are given by way of example, and other suitable embodiments can also be used. For example, although in the embodiments described above we assume that the input ports and output ports are of the same interface type, in other embodiments different types can also be used. For example, the input ports may connect to an Ethernet network, whereas the output ports connect to a PCIe bus.

In the embodiments described above we generally assume that the packet processing module and the forwarding modules handle the received packets on-the-fly as soon as the packets arrive. As such, the forwarding modules make forwarding decisions per packet. In alternative embodiments, the received packets are buffered before being processed and forwarded.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
one or more input ports;
multiple output ports, configured to transmit packets over multiple respective network links of a communication network;
a plurality of counters; and
a plurality of load balancers, each load balancer configured to distribute packets from at least one of the one or more input ports between a respective sub-group of the output ports associated with the load balancer,
wherein each load balancer is configured to manage, for each of the output ports associated with the load balancer, in respective counters of the plurality of counters, a data-count indicative of a respective data volume of the packets forwarded for transmission through the output port by the load balancer, and
wherein the load balancers are configured to select output ports for the packets, responsively to the data-counts, wherein the load balancers are configured to pause or slow down delivery of packets to output ports responsively to flow control signaling imposed by a next-hop network element, and wherein after the pause or slow down is over, the load balancers are configured to advance the data-count of ports which were paused or slowed down to compensate for the time in which the port was paused or slowed down, and wherein the load balancers are configured to advance the data-count of ports which were paused or slowed down to a minimum, average or maximum of the data-counts of other output ports in the sub-group of the output ports to which the data-count belongs.

2. The network element according to claim 1, wherein at least one of the load balancers is configured with respective weights for each of the output ports in the sub-group of the output ports associated with the load balancer, and to distribute packets among the sub-group of the output ports associated with the load balancer based on the assigned weights.

3. The network element according to claim 1, wherein the load balancers are configured to select for each packet, the output port that the plurality of counters indicate is the output port to which a minimal amount of data has been forwarded, among the sub-group of the output ports associated with the load balancer.

4. The network element according to claim 1, wherein the load balancers are configured to select an output port responsively to the data-counts periodically, while between the selections based on the data-counts, the output port is selected without relation to the data-counts.

5. The network element according to claim 4, wherein the network element includes circuitry which manages state information for flows of packets and wherein the state information of a flow indicates a rule as to how an output port is to be selected for packets belonging to the flow, when the selection is performed without relation to the data-counts.

6. The network element according to claim 4, wherein the network element includes circuitry which manages state information for flows of packets and wherein the state information of a flow indicates a rule as to when the selection is performed without relation to the data-counts.

7. The network element according to claim 1, wherein the packets destined to the multiple output ports have different respective delivery priorities, and wherein the load balancers are configured to select the output port based at least on the delivery priority of a packet destined to the multiple output ports.

8. A network element, comprising:
multiple output ports, configured to transmit packets over multiple respective network links of a communication network; and
circuitry, configured to:
receive from the communication network, via one or more input ports of the network element, packets that are destined for transmission via the multiple output ports;
monitor multiple data-counts, each data-count corresponding to a respective output port, and is indicative of a respective data volume of the packets forwarded for transmission via the respective output port; and
select for each given received packet an output port among the multiple output ports, and forward the given packet for transmission via the selected output port,
wherein the circuitry is configured to select an output port for at least some of the received packets, responsively to the data-counts, in accordance with a criterion which reduces a difference between weighted values of the data-counts,
wherein the circuitry is configured to select an output port responsively to the data-counts periodically, while between the selections based on the data-counts, the output port is selected without relation to the data-counts, and
wherein the circuitry is configured to select the output ports in a cyclic order, between the selections based on the data-counts.

9. The network element according to claim 8, wherein the circuitry is configured to select an output port responsively to the data-counts for less than 10% of the packets handled by the load balancer.

10. The network element according to claim 8, wherein the circuitry is configured to repeatedly use previously selected output ports, between the selections based on the data-counts.

11. The network element according to claim 8, wherein the packets destined to the multiple output ports belong to a plurality of different traffic types, and wherein the circuitry is configured to select the output port based on the data-counts at different rates for packets of different types.

12. The network element according to claim 8, wherein the packets destined to the multiple output ports belong to a plurality of different traffic types, and wherein the circuitry is configured to select the output ports for packets of different types based on different selection methods, between the selections based on the data-counts.

13. A network element, comprising:
multiple output ports, configured to transmit packets over multiple respective network links of a communication network; and
circuitry, configured to:
receive from the communication network, via one or more input ports of the network element, packets that are destined for transmission via the multiple output ports;
monitor multiple data-counts, each data-count corresponding to a respective output port, and is indicative of a respective data volume of the packets forwarded for transmission via the respective output port; and
select for each given received packet an output port among the multiple output ports, and forward the given packet for transmission via the selected output port,
wherein the circuitry is configured to select an output port responsively to the data-counts periodically, while between the selections based on the data-counts, the output port is selected without relation to the data-counts,
wherein the packets destined to the multiple output ports have different respective delivery priorities, and wherein the circuitry is configured to select the output port for all packets identified as having a high priority based on the data-counts, while the output port for packets having a lower priority are selected based on the data-counts, only periodically.

14. A method, comprising:
in a network element, transmitting packets via multiple output ports of the network element over multiple respective links of a communication network;
receiving from the communication network, via one or more input ports of the network element, packets that are destined for transmission via the multiple output ports;
monitoring multiple data-counts, each data-count corresponding to a respective output port, and is indicative of a respective data volume of the packets forwarded for transmission via the respective output port; and based on the data-counts, selecting for each given received packet an output port among the multiple output ports, in accordance with a criterion which reduces a difference between weighted values of the data-counts, and forwarding the given packet for transmission via the selected output port, wherein selecting the output port is performed responsively to the data-counts periodically, while between the selections based on the data-counts, the output port is selected without relation to the data-counts, and wherein selecting the output ports is performed in a cyclic order, between the selections based on the data-counts.

15. The method according to claim 14, wherein different selection rules are used for traffic of different transport protocols.

16. The method according to claim 14, wherein selecting the output port comprises selecting an output port to which a minimal amount of data has been forwarded, among the multiple output ports, in a recent interval.

17. The method according to claim 14, wherein selecting the output port comprises determining an amount of data to be transmitted via the selected output port before switching to a different output port.

* * * * *